United States Patent
Hunt (10) Patent No.: US 8,991,136 B2
(45) Date of Patent: Mar. 31, 2015

(54) METHOD OF ATTACHING A FASTENER TO A CEMENTITIOUS MATERIAL BODY

(71) Applicant: Christopher M. Hunt, Chamblee, GA (US)

(72) Inventor: Christopher M. Hunt, Chamblee, GA (US)

(*) Notice: Subject to any disclaimer, the term of this patent is extended or adjusted under 35 U.S.C. 154(b) by 0 days.

(21) Appl. No.: 14/036,538

(22) Filed: Sep. 25, 2013

(65) Prior Publication Data

US 2014/0166188 A1    Jun. 19, 2014

Related U.S. Application Data

(62) Division of application No. 11/497,653, filed on Jul. 31, 2006, now Pat. No. 8,556,558.

(51) Int. Cl.
   *E04G 23/00*    (2006.01)
   *F16B 39/02*    (2006.01)
   *F16B 13/00*    (2006.01)
   *F16B 13/14*    (2006.01)
   *F16B 25/00*    (2006.01)

(52) U.S. Cl.
   CPC ............ *F16B 39/021* (2013.01); *F16B 13/002* (2013.01); *F16B 13/141* (2013.01); *F16B 25/00* (2013.01)
   USPC .......................................... 52/745.21; 52/700

(58) Field of Classification Search
   CPC .. F16B 13/002; F16B 13/003; F16B 25/0026; F16B 25/103; F16B 39/021; E21D 20/02
   USPC ............ 52/698–700, 745.21; 156/92; 411/82, 411/82.1, 387.1, 387.6, 387.7, 387.8
   See application file for complete search history.

(56) References Cited

U.S. PATENT DOCUMENTS

| | | | | |
|---|---|---|---|---|
| 4,973,210 A | * | 11/1990 | Osborne et al. | 411/389 |
| 6,896,462 B2 | * | 5/2005 | Stevenson et al. | 411/82 |
| 7,070,376 B1 | * | 7/2006 | Toback | 411/82.2 |
| 7,726,923 B2 | * | 6/2010 | Fankhauser et al. | 411/82 |
| 2002/0078659 A1 | * | 6/2002 | Hunt | 52/745.13 |

* cited by examiner

*Primary Examiner* — Charles A Fox
*Assistant Examiner* — Patrick Maestri
(74) *Attorney, Agent, or Firm* — Rodgers & Rodgers (57) ABSTRACT

A method for fastening cementitious components together or for fastening a cementitious component to a non-cementitious component to form a structure. In a preferred embodiment, the apparatus is a screw having a hollow shaft from which threads protrude and a tip comprising a plurality of drilling teeth or a plurality of thread members that surround said central space, each of said thread members forming a two-dimensional spiral. In use, the invention is operated by screwing it into the cementitious components and then injecting an adhesive into the void created by the screwing step.

3 Claims, 7 Drawing Sheets

METHOD OF ATTACHING A FASTENER TO A CEMENTITIOUS MATERIAL BODY

This application is a division of application Ser. No. 11/497,653 filed Jul. 31, 2006.

BACKGROUND OF THE INVENTION

This invention relates to an apparatus and method for fastening cementitious structural components, e.g., autoclaved aerated concrete or other cementitious components, together and for fastening other components to such cementitious structural components. In particular, the invention relates to a fastener for use in autoclaved aerated concrete and its use.

The background art is characterized by U.S. Pat. Nos. 86,935; 2,351,449; 2,603,319; 3,202,035; 3,361,481; 3,494,133; 4,092,814; 4,247,223; 4,696,354; 4,765,778; 5,002,435; 5,044,832; 5,085,026; 5,143,498; 5,531,553; 6,048,343; and 6,296,433; U.S. Patent Application No. 2002/0174606; 2004/0109738; and 2004/0161316; the disclosures of which patents and application are incorporated by reference as if fully set forth herein. The background art is also characterized by Japan Patent No. JP 2000-297588, German Patent No. DE 44 08 159, United Kingdom Patent No. GB 2 256 666 and Williamson, IBM Technical Disclosure Bulletin, February, 1962.

BRIEF SUMMARY OF THE INVENTION

One purpose of preferred embodiments of the invention is to allow the fastening of together of cementitious (e.g., autoclaved aerated concrete) structural components. Another purpose of preferred embodiments of the invention is to allow fastening other components to such cementitious structural components. One advantage of preferred embodiments of the invention is that it creates a void between the shaft of the screw and the wall of hole in the cementitious material into which it is being installed. Another advantage of preferred embodiments of the invention is that it allows the head of the screw to be countersunk. Another advantage of preferred embodiments of the invention is that it allows quick release of the component being fastened by the crane being used to lift the component into place.

One object of preferred embodiments of the invention is to facilitate the fastening together of autoclaved aerated concrete components. Another object of preferred embodiments of the invention is to fasten together two separate, distinct pieces of cementitious material to produce a monolithic, reinforced piece. Another object of preferred embodiments of the invention is to allow an adhesive to be used to hold the fastener in the hole it creates during the screwing step of the installation process.

The invention is a method for fastening cementitious components together or for fastening a cementitious component to a non-cementitious component to form a structure. The apparatus comprises a screw having a hollow shaft from which screw threads protrude, a screw tip comprising spiral tip threads and a head. In use, the invention is operated by screwing it into the cementitious components and then injecting an adhesive into the void created by the screwing step.

In a preferred embodiment, the fastener is for use in a cementitious material (e.g., autoclaved aerated concrete), said fastener comprising: a shaft comprising a first portion having a (preferably cylindrical) first shaft outer surface, a (preferably cylindrical) first shaft inner surface and a first shaft outside diameter and a second portion having a second shaft outer surface (preferably having a truncated conical shape), a second shaft inner surface (preferably having a truncated conical shape) and a second shaft outside diameter, said shaft having a longitudinal void therein; a longitudinal axis and two ends; a shaft thread that is attached to said first shaft outer surface and said second shaft outer surface, said shaft thread having a variable shaft thread outer diameter with a maximum extent; a tip that is attached to one end of said shaft, said tip having an upper tip outside diameter that is greater than said second shaft outside diameter, said tip comprising tip threads that are self-centering and self-setting, said tip threads comprising a plurality of thread members that are substantially triangular in cross section and that surround a substantially conical space that is in communication with said longitudinal void; and a head that is attached to the other end of said shaft. Preferably, said second shaft inner surface is rifled. Preferably, said head comprises grinding teeth and has a head outer diameter that is less than or equal to the maximum extent of said shaft thread outer diameter. Preferably, said shaft thread has holes therein that are aligned parallel with said longitudinal axis. Preferably, second shaft inner surface is provided with a plurality of spiraling ridges that extend from said second end to said first shaft inner surface. Preferably, said first portion has radial holes therein. Preferably, said first portion has radial holes therein. Preferably said head has a receiver for a bit, said receiver being in communication with said longitudinal void, said receiver having slots therein.

In yet another preferred embodiment, the fastener is for use in a cementitious material (e.g., autoclaved aerated concrete), said fastener comprising: a shaft comprising a first portion having a first shaft outer surface and a first shaft inner surface and a second portion having a second shaft outer surface and a second shaft inner surface, said shaft having a longitudinal void therein and two ends; a shaft thread that is attached to said first shaft outer surface and said second shaft outer surface; a tip that is attached to one end of said shaft, said tip comprising tip threads, said tip threads comprising a plurality of thread members that surround a space that is in communication with said longitudinal void; and a head that is attached to the other end of said shaft.

In a further embodiment, the fastener comprises a shaft having two ends, an outer surface and a longitudinal bore; a screw thread having a base that is attached to said outer surface along a curve traced on surface outer surface by its rotation past a point crossing a right section of said shaft at an oblique angle; a tip that is attached to one end of said shaft, said tip having a central space that is in communication with said longitudinal bore, said tip comprising a plurality of thread members that surround said central space, each of said thread members forming a two-dimensional spiral having a maximum outer diameter. Preferably, the fastener further comprises a head that is attached to the other end of said shaft. Preferably, said screw thread is perforated by a plurality of aligned holes. Preferably, said shaft comprises a first portion and a second portion, said first portion being cylindrical in shape and having a cylinder diameter and said second portion having the shape of a truncated cone with a base having a base diameter, and wherein said base diameter is greater than said cylinder diameter and approximately equal to said maximum outer diameter. Preferably, said longitudinal bore is rifled. Preferably, a plurality of holes extend from said longitudinal bore to said outer surface. Preferably, said head has a receiver that is capable of accepting a screwdriver or drill bit of polygonal cross section. Preferably, said head has a hole through which an adhesive is injectable.

In another preferred embodiment, the invention is a method for attaching a fastener to a cementitious material body (e.g., an autoclaved aerated concrete body), said method comprising: screwing the fastener into the body, the fastener being operative to penetrate a portion of the body and create a void therein by crushing the portion of the body into which it penetrates to produce crushed cementitious product, and moving said crushed cementitious product into a longitudinal void in the fastener; and when the fastener is seated in the autoclaved aerated concrete body, injecting a thermosetting plastic (e.g., epoxy) into said void through holes in the threads and head of the fastener.

In another preferred embodiment, the fastener comprises a shaft having two ends, an outer surface and a longitudinal bore; a screw thread having a base that is attached to said outer surface along a curve traced on said outer surface by its rotation past a point crossing a right section of said shaft at an oblique angle; a tip that is attached to one end of said shaft, said tip having a central space that is in communication with said longitudinal bore, said tip having a plurality of drilling teeth protruding from it that surround said central space, said tip having a maximum outer diameter.

In yet another preferred embodiment, the fastener joins two separate cementitious items without pre-drilling of a hole into the two separate cementitious items in which to insert the fastener, the fastener comprising: a shaft having two ends, an outer surface and a longitudinal bore; a screw thread having a base that is attached to said outer surface along a curve traced on said outer surface by its rotation past a point crossing a right section of said shaft at an oblique angle; and a tip that is attached to one end of said shaft, said tip having a central space that is in communication with said longitudinal bore, said tip comprising a plurality of thread members that surround said central space, each of said thread members forming a two-dimensional spiral having a maximum outer diameter; wherein said tip, said screw thread and said tip constitute a single component and said fastener is operative to join the two separate cementitious items to produce an adhered and reinforced single object.

In a further preferred embodiment, the invention is a method for fastening and adhering two cementitious material bodies to become one reinforced object without pre-drilling either of the cementitious material bodies, the method comprising: placing the cementitious material bodies adjacent to one another so that one of their surfaces abut; screwing a fastener having threads and a head into the cementitious material bodies, the fastener being operative to penetrate all of one of the cementitious material bodies and at least a portion of the other of the cementitious material bodies and create a void therein by crushing the portion of the cementitious material bodies into which it penetrates to produce crushed cementitious product, and moving said crushed cementitious product into a longitudinal void in the fastener; and when the fastener is seated in the cementitious material bodies, injecting a thermosetting plastic adhesive or a grout adhesive into said void through holes in the threads and head of the fastener; thereby fastening and adhering the two cementitious material bodies to become one reinforced object without pre-drilling by using only the fastener and the adhesive.

Further aspects of the invention will become apparent from consideration of the drawings and the ensuing description of preferred embodiments of the invention. A person skilled in the art will realize that other embodiments of the invention are possible and that the details of the invention can be modified in a number of respects, all without departing from the concept. Thus, the following drawings and description are to be regarded as illustrative in nature and not restrictive.

BRIEF DESCRIPTION OF THE SEVERAL VIEWS OF THE DRAWINGS

The features of the invention will be better understood by reference to the accompanying drawings which illustrate presently preferred embodiments of the invention. In the drawings.

The following reference numerals are used to indicate the parts and environment of the invention on the drawings:
  10 fastener, screw
  12 shaft
  14 helical rib, screw thread
  16 tip
  18 head
  20 first portion
  22 second portion
  24 longitudinal void, longitudinal bore
  26 first shaft outer surface
  28 first shaft inner surface
  32 second shaft outer surface
  34 second shaft inner surface
  38 spiraling ridges
  40 thread members
  42 space, central space
  46 grinding teeth
  48 longitudinal holes
  50 radial holes
  54 receiver
  60 cementitious body, autoclaved aerated concrete body
  62 parallel void
  64 terminal slot
  66 wall
  70 rifling, spiral grooves
  72 opening
  74 drilling teeth
  76 thermoset plastic, thermosetting plastic or grout
  78 escaping air
  80 bottom surface

DETAILED DESCRIPTION OF THE INVENTION

The disclosures of the following patent applications are incorporated by reference as if fully set forth herein: U.S. patent application Ser. No. 11/123,635, filed May 6, 2005, now pending; U.S. patent application Ser. No. 10/210,035, filed Jul. 23, 2003, now pending; U.S. patent application Ser. No. 09/784,848, filed Feb. 16, 2001, now abandoned; U.S. patent application Ser. No. 09/741,787, filed Dec. 21, 2000, now abandoned; and U.S. Provisional Patent Application No. 60/183,472, filed Feb. 18, 2000; the disclosures of which patent applications are incorporated by reference as if fully set forth herein.

Figure 1:
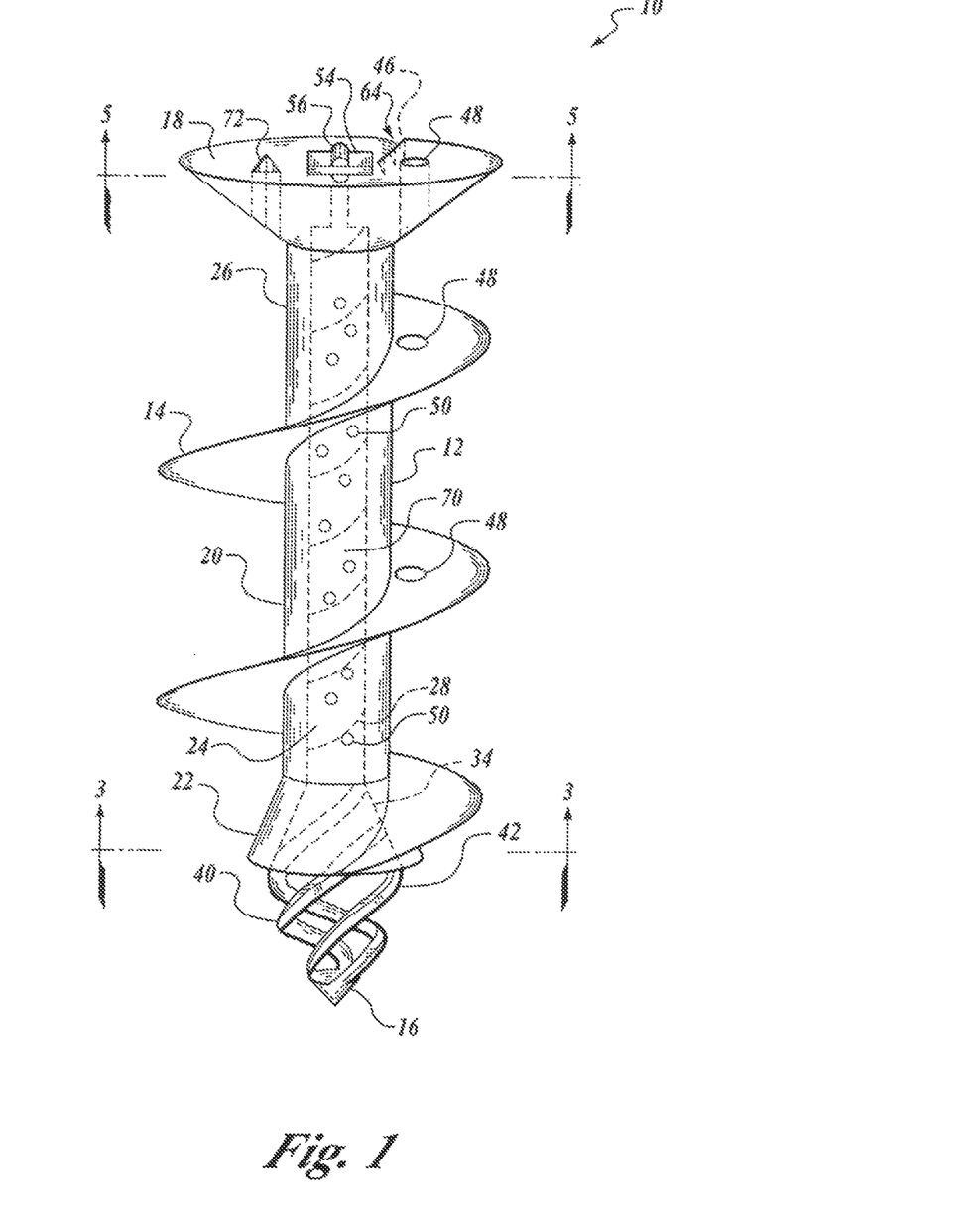
FIG. 1 is a side view of a preferred embodiment of the invention.

Referring to FIG. 1, a preferred embodiment of fastener 10 is presented. In this embodiment, fastener 10 comprises shaft 12, helical rib or screw thread 14 that projects from shaft 12, tip 16 that is attached to a first end of shaft 12 and head 18 that is attached to a second end of shaft 12. Shaft 12 preferably comprises first portion 20 and second portion 22 through which longitudinal void 24 extends, a shaft longitudinal axis and two ends. First portion 20 preferably has first shaft outer surface 26, first shaft inner surface 28 and a first shaft outside diameter.

In a preferred embodiment, first portion 20 is cylindrical and screw thread 14 is attached at its base to outer surface 26 along a curve traced on outer surface 26 by its rotation past a point crossing a right section of first portion 20 at a (preferably constant) oblique angle. Preferably, screw thread 14 is self-starting and self-tapping in that the lower end of screw thread 14 extends outward from shaft 12 less far than the upper end of screw thread 14 does. In this embodiment, a line along the base of screw thread 14 forms a right-handed helix. Preferably, first shaft inner surface 28 is rifled (a plurality of spiral grooves 70 are provided) so that rotation of screw 10 urges cementation material crushed by the installation of screw 10 to move upward through longitudinal void 24.

In a preferred embodiment, second portion 22 has a second shaft outer surface 32, second shaft inner surface 34 (both of which preferably have the shape of a truncated cone) and a second shaft outside diameter. In a preferred embodiment, second shaft inner surface 34 is provided with a plurality of spiraling ridges 38 that extend from said second end to first shaft inner surface 28. In a preferred embodiment, second portion 22 has radial holes 50 therein. In an alternative embodiment, first portion 20 has radial holes 50 therein. Radial holes 50 allow air to escape from longitudinal void 24 as it is filled with crushed cementitious material.

Screw thread 14 is attached to first shaft outer surface 26 and said second shaft outer surface. Preferably, screw thread 14 has a shaft thread outer diameter. In a preferred embodiment, shaft thread 14 is provided with holes 48 therein that are preferably aligned parallel with the shaft longitudinal axis.

Tip 16 has a tip upper outside diameter that is greater than the second shaft outside diameter. Tip 16 comprises tip threads 38 that are self-centering and self-setting, the tip threads 38 comprising a plurality of thread members 40 that are preferably substantially triangular in cross section and that surround space 42 that is in communication with longitudinal void 24. In a preferred embodiment, space 42 is conical in shape and the bases of thread members 40 follow along a curve traced on the outer extent of space 42 by its rotation past a point crossing a right section of space 42 at a (preferably constant) oblique angle. In this embodiment, each of thread members 40 forms a conical helix, that is, a two-dimensional spiral on a conical surface, with the distance to the apex of the spiral an exponential function of the angle indicating direction from the axis of the spiral. In this embodiment, thread members 40 follow a curve which turns around a central axis, getting progressively closer to or farther from it, depending on which way one follows the curve.

Head 18 is preferably attached to the other end of shaft 12. Head 18 preferably comprising grinding teeth 46 and has a head outer diameter that is less than of equal to the shaft thread outer diameter. Grinding teeth 46 are configured so that rotation of screw 10 during its installation grinds away the cementitious material beneath head 18, thereby allowing head 18 to be countersunk.

Figure 2:
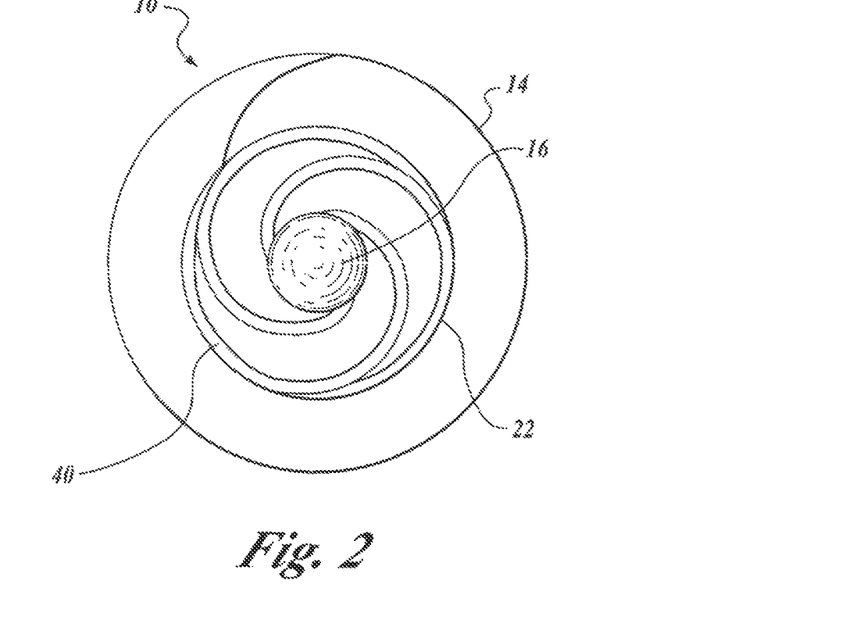
FIG. 2 is a bottom plan view (looking up) of a preferred embodiment of the invention.

Referring to FIG. 2, a bottom view of screw 10 is presented. Tip 16 is shown to comprise four tip threads 38. One of the tip threads 38 preferably matches up with shaft thread 14.

Figure 3:
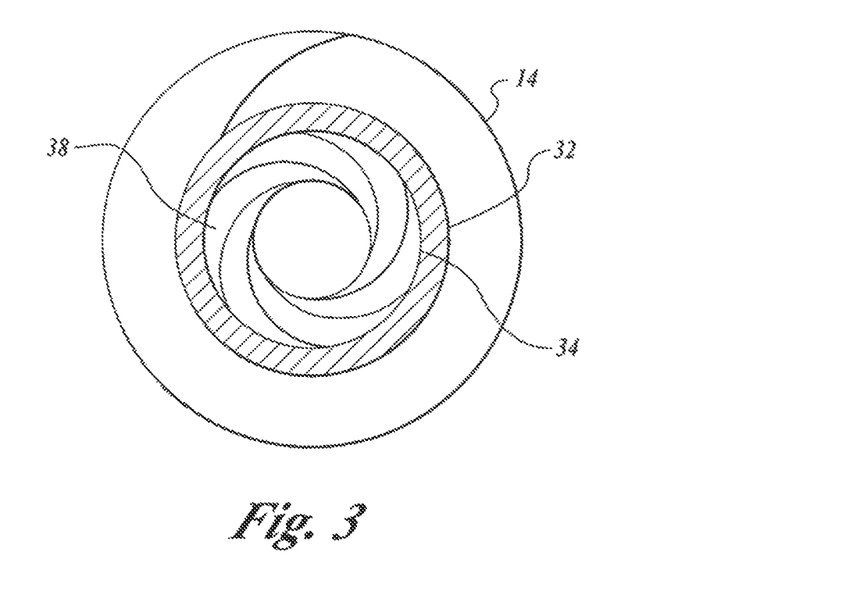
FIG. 3 is a bottom cross-sectional view (looking up) through section 3-3 on FIG. 1.

Referring to FIG. 3, a cross-sectional view through second portion 22 is presented at the section indicated on FIG. 1. In this view, the plurality of thread members 40 is visible. The plurality of thread members 40 move ACC material up and into longitudinal void 24. In this preferred embodiment, the plurality of thread members 40 are closer together and narrower as they approach the mouth of longitudinal void 24, thereby causing the pieces of ACC material created by screwing fastener 10 into ACC body 60 to be broken up into smaller pieces.

Figure 4:
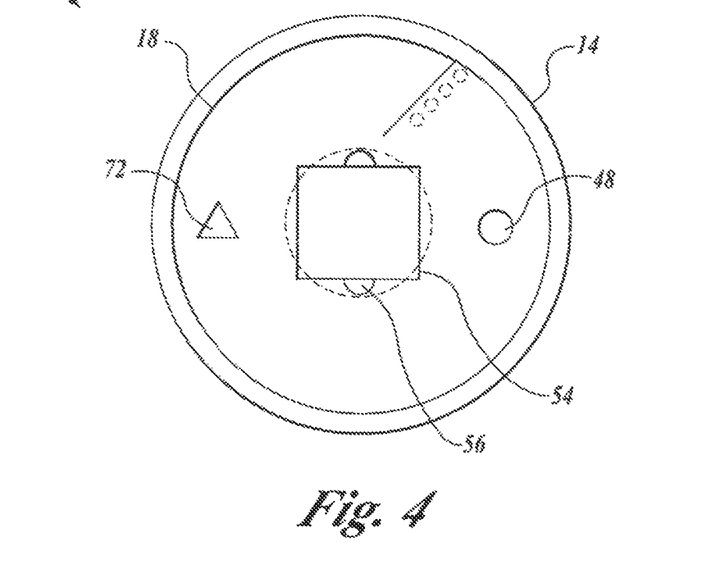
FIG. 4 is a top plan view of a preferred embodiment of the invention.

Referring to FIG. 4, a top view of a preferred embodiment of fastener 10 is presented. In this embodiment, head 18 has receiver 54 for accepting a bit (not shown). Preferably, receiver 54 is in communication with longitudinal void 24 and receiver 54 has slots 56 in its sides. Slots 56 allows air present in longitudinal void 24 to escape as crushed ACC material enters longitudinal void 24 during the screwing step of the installation process.

Figure 5:
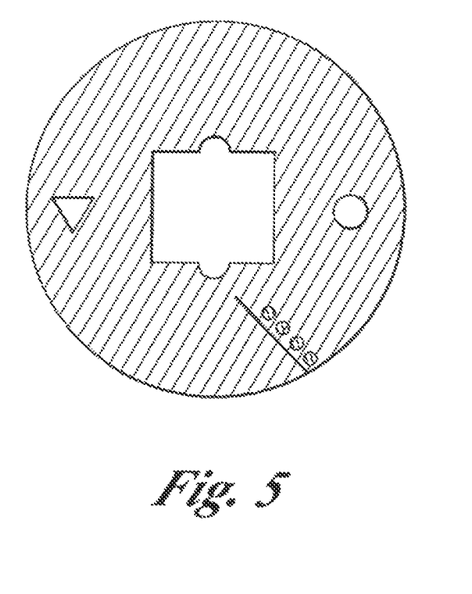
FIG. 5 is a cross-sectional view (looking up) through section 5-5 on FIG. 1.

Referring to FIG. 5, a cross-sectional view through a preferred embodiment of head 18 is presented at the section indicated on FIG. 1. In this view, receiver 54 is shown in the center of head 18. In this embodiment, longitudinal holes 48 are shown having a circular cross-sectional different shape. Opening 72 is also preferably provided in head 18. Grinding teeth 46 are shown attached to head 18.

Figure 6:
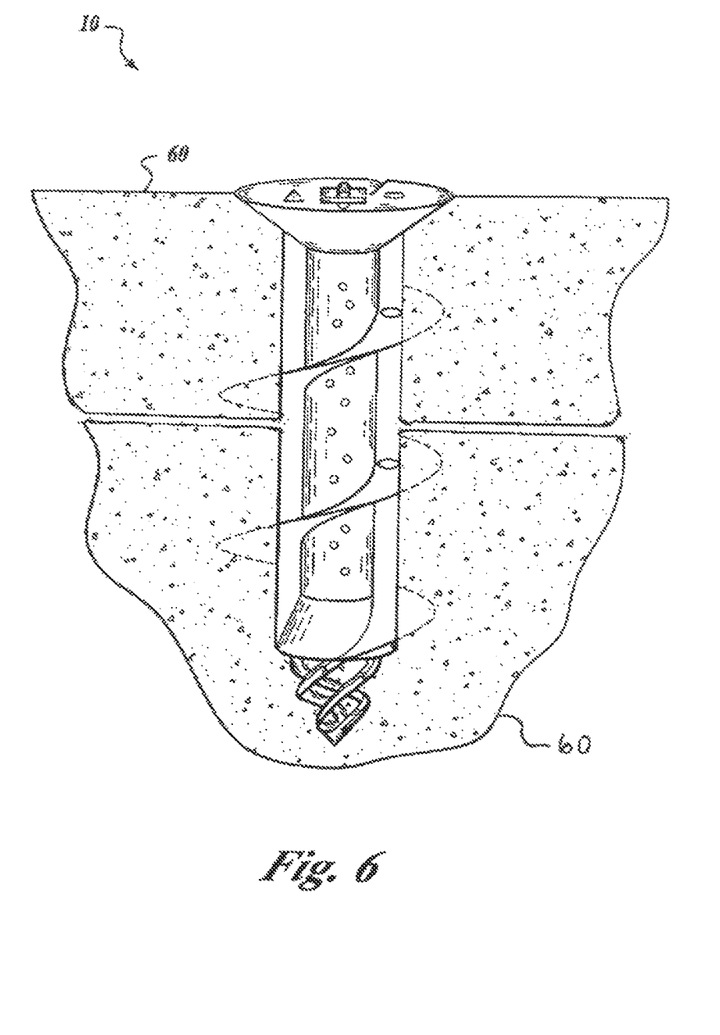
FIG. 6 is side view of a preferred embodiment of the invention installed in cementitious material. In this view, the thread members are shown penetrating the cementitious material and the front half of the cementitious material (the half in front of a plane through the centerline of the invention) is removed for clarity.
Figure 7:
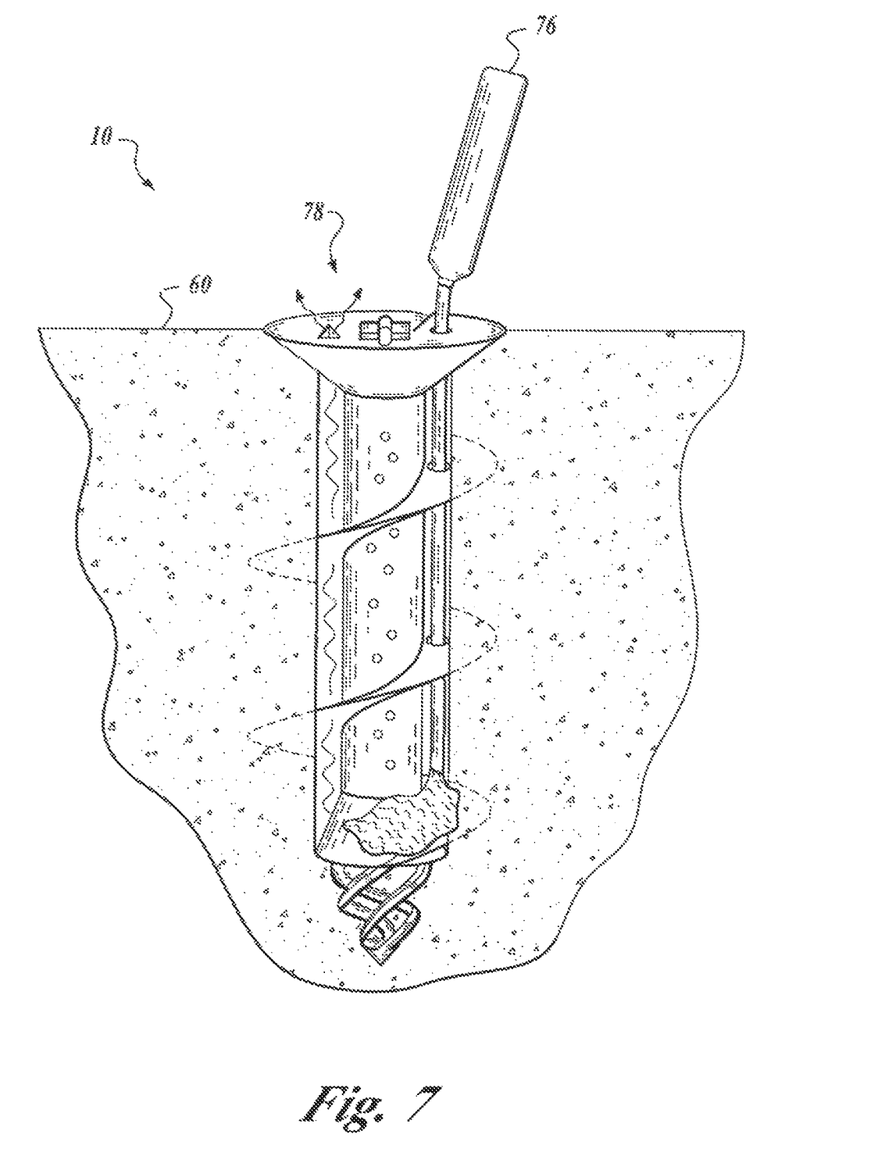
FIG. 7 is a perspective view of a preferred embodiment of the invention of FIG. 6 with a thermoset plastic being injected into the hole created by the invention.

Referring to FIG. 6, fastener 10 is shown installed in two cementitious material bodies 60, preferably autoclaved aerated concrete (AAC) bodies 60, that have been placed adjacent to one another so that one of their surfaces abut. Fastener 10 is screwed into AAC bodies 60 using a screw driver having a bit that fits in receiver 54. Fastener 10 is operative to penetrate all of the first ACC body 60 and a portion of the other AAC body 60 and create parallel void 62 therein by crushing the portion of the AAC into which it penetrate to produce crushed cementitious product, and moving said crushed cementitious product into longitudinal void 24 in fastener 10. When fastener 10 is seated in AAC bodies 60, a thermosetting plastic (e.g., epoxy) or grout 76 is injected into parallel void 24 through longitudinal holes 48 in screw threads 14 and in head 18 of fastener 10 as illustrated in FIG. 7. During this operation, escaping air 78 discharges from opening 72.

Injectors for thermoplastics and/or grouts having tubular nozzles that are capable of being inserted into holes, such as longitudinal holes 48, are well known in the art. In this embodiment, excess thermosetting plastic or grout 76 discharges from opening 72 when parallel void 24 is full. In a preferred embodiment, after parallel void is full, the thermosetting plastic or grout is injected into parallel void during the removal of the tubular nozzles, thereby causing the excess thermosetting plastic or grout 76 that discharges from opening 72 to cover countersunk head 18. The result is that, when installed, fastener 10 is hidden and a smooth finish is produced at the surface of ACC body 60.

Parallel void 62 is created as fastener 10 is screwed into AAC body 60 because the outside diameter of second portion 22 is larger than the outer diameter of first portion 20. Fastener 10 is preferably countersunk into ACC body 60. This is preferably facilitated by providing grinding teeth 46 on the underside of head 18. In preferred embodiments, head 18 is provided with terminal slot 64, one surface of which is bound by screw thread 14. In this embodiment, screw thread 14 terminates in head 18 by becoming horizontal, thereby rendering fastener 10 self-stopping during the screwing step of the installation process.

Screw threads 14 protrude into wall 66 of parallel void 62, gripping ACC body 60 and holding fastener 10 in place until a thermosetting plastic or grout can be injected into parallel void 62. This allows components of cementitious structures, such as AAC body 60, to be held in place by a crane while fastener is screwed into AAC body 60, and then released after the screwing step, because screw threads are configured to hold the components together until the thermosetting plastic or grout is injected at a later time, e.g., at the end of the day. In a preferred embodiment, thermosetting plastic or grout that has been injected into parallel void 62 hardens in longitudinal holes 48, further anchoring fastener 10 in ACC body 60.

Figure 8:
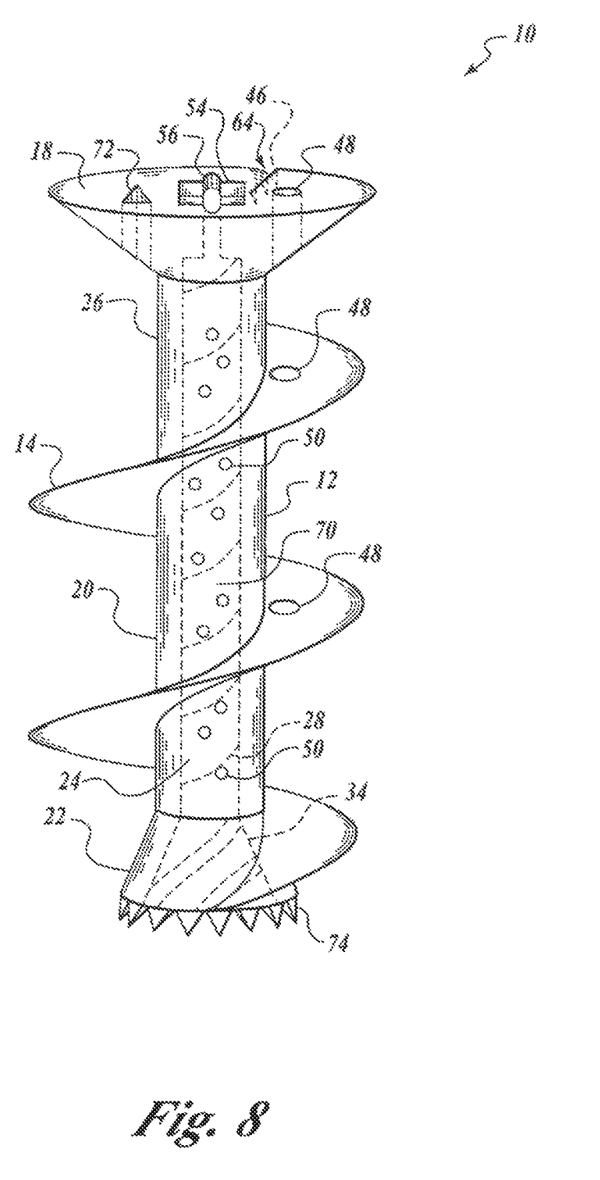
FIG. 8 is a perspective view of an alternate embodiment of the invention having teeth along the bottom surface of the second portion.
Figure 9:
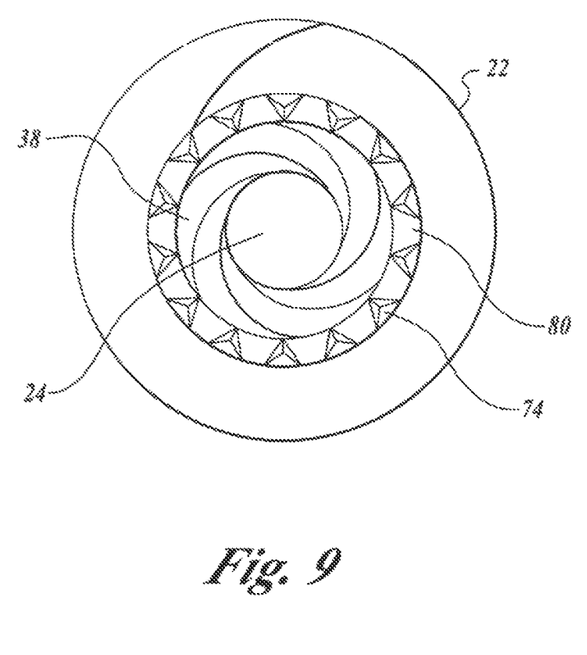
FIG. 9 is a plan view (looking up) at the bottom of the alternate embodiment of FIG. 7.

Referring to FIGS. 8 and 9, an alternate embodiment of the invention is illustrated. In this embodiment, thread members 40 are not provided. Instead, drilling teeth 74 are provided along and protrude from bottom surface 80 of second portion 22. Drilling teeth 74 serve to grind a hole in aerated autoclaved concrete body 60.

Many variations of the invention will occur to those skilled in the art. Some variations do not include providing rifling 70 and radial holes 50. Other variations do not call for providing thread members 40. All such variations are intended to be within the scope and spirit of the invention.

Although some embodiments are shown to include certain features, the applicant specifically contemplate that any feature disclosed herein may be used together or in combination with any other feature on any embodiment of the invention. It is also contemplated that any feature may be specifically excluded from any embodiment of the invention.

The invention claimed is:

1. A method for attaching a fastener to a cementitious material body, said fastener comprising a shaft, said shaft having a longitudinal void therein and two ends, screw threads and a tip attached to one end of said shaft; said tip comprising a plurality of tip thread members that surround a space that is in communication with said longitudinal void;

said method comprising:

screwing the fastener into the cementitious material body, the fastener being operative to penetrate a portion of the cementitious material body and create a void having a wall therein by crushing the portion of the cementitious material into which it penetrates to produce crushed cementitious product, moving said crushed cementitious product by means of said thread members into said longitudinal void in the fastener, the fastener also being operative to protrude into said wall thereby gripping the cementitious material body; and when the fastener is seated in the cementitious material body, injecting a thermosetting plastic or a grout into said void through holes in screw threads and head of the fastener.

2. A method for attaching a fastener to a cementitious material body, said fastener comprising a shaft, said shaft having a longitudinal void therein and two ends, screw threads and a tip attached to one end of said shaft, said tip comprising a plurality of tip thread members that surround a space that is in communication with said longitudinal void;

said method comprising;

screwing the fastener having screw threads and a head into the cementitious material body, the fastener being operative to penetrate a portion of the cementitious material body and create a void therein by crushing the portion of the cementitious material into which it penetrates to produce crushed cementitious product, moving said crushed cementitious product by means of said tip thread members into said longitudinal void in the fastener; and when the fastener is seated in the cementitious material body, injecting a thermosetting plastic or a grout into said void through holes in screw threads and head of the fastener.

3. A method for fastening and adhering two cementitious material bodies to become one reinforced object without predrilling either of the cementitious material bodies, said method comprising:

placing the cementitious material bodies adjacent to one another so that one of their surfaces abut;

screwing a fastener having threads and a head into the cementitious material bodies, said fastener comprising a shaft, said shaft having a longitudinal void therein and two ends, screw threads and a tip attached to one end of said shaft, said tip comprising a plurality of tip thread members that surround a space that is in communication with said longitudinal void;

the fastener being operative to penetrate all of one of the cementitious material bodies and at least a portion of the other of the cementitious material bodies to create a void therein by crushing the portion of the cementitious material bodies into which it penetrates to produce crushed cementitious product, and moving said crushed cementitious product by means of said tip thread members into said longitudinal void in the fastener; and when the fastener is seated in the cementitious material bodies, injecting a thermosetting plastic adhesive or a grout adhesive into said void through holes in the screw threads and head of the fastener;

thereby fastening and adhering the two cementitious material bodies to become one reinforced object without predrilling by using only the fastener and said adhesive.

* * * * *